US012739697B2

(12) United States Patent
Tsai et al.

(10) Patent No.: US 12,739,697 B2
(45) Date of Patent: Sep. 15, 2026

(54) DETECTION METHOD OF RAN INTELLIGENT CONTROLLER IN OPEN ARCHITECTURE

(71) Applicant: AURAY TECHNOLOGY CORP., Taoyuan City (TW)

(72) Inventors: Chih-Ming Tsai, Taoyuan City (TW); Da-Syun Chen, Taoyuan City (TW)

(73) Assignee: AURAY TECHNOLOGY CORP., Taoyuan City (TW)

( * ) Notice: Subject to any disclaimer, the term of this patent is extended or adjusted under 35 U.S.C. 154(b) by 369 days.

(21) Appl. No.: 18/432,198

(22) Filed: Feb. 5, 2024

(65) Prior Publication Data

US 2025/0150894 A1 May 8, 2025

(30) Foreign Application Priority Data

Nov. 7, 2023 (TW) ................................ 112142772

(51) Int. Cl.
*H04W 28/06* (2009.01)
*H04W 28/084* (2023.01)

(52) U.S. Cl.
CPC ......... *H04W 28/06* (2013.01); *H04W 28/084* (2023.05)

(58) Field of Classification Search
CPC ... H04W 28/06; H04W 28/084; H04W 24/02; H04W 88/12; H04L 41/40; H04L 43/50
See application file for complete search history.

(56) References Cited

U.S. PATENT DOCUMENTS

2004/0210927 A1* 10/2004 Bahr ................ H04N 21/47202 348/E7.071
2009/0034556 A1* 2/2009 Song ................ H04N 21/23614 370/471
2021/0184989 A1* 6/2021 Wu ....................... H04L 47/762

OTHER PUBLICATIONS

Vodafone Radio Networks and Keysight Technologies, "Open RAN Handbook," Version 1.0, Feb. 2023, https://www.vodafone.com/sites/default/files/2023-08/vodafone-open-ran-handbook.pdf.

(Continued)

*Primary Examiner* — Kiet Tang
(74) *Attorney, Agent, or Firm* — Li & Cai Intellectual Property (USA) Office

(57) ABSTRACT

A detection device and a detection method of a RAN intelligent controller in open architecture are provided. The detection device includes a standard database, a communication unit, and a judgment unit. The standard database includes multiple pieces of standard specified information, each of which includes an E2 transmission command and E2 qualification data that match each other. The communication unit includes a sending module and a receiving module. The sending module can send the E2 transmission command to a near-real time radio access network intelligent controller, so that the near-real time radio access network intelligent controller can be connected to an evolved node B and a next generation node B through an E2 interface for sending E2 feedback data to the receiving module. The judgment unit selects a matching one of the E2 qualification data according to the E2 transmission command for comparison with the E2 feedback data.

4 Claims, 5 Drawing Sheets

(56) References Cited

OTHER PUBLICATIONS

Bo Tang,Senior,IEEE,Vijay K.Shah,Member,IEEE,Vuk Marojevic,Senior,IEEE,Jeffrey H.Reed, Fellow,IEEE, “AI Testing Framework for Next-G O-RAN Networks: Requirements, Design, and Research Opportunities”, Nov. 8, 2022, http://arXiv.org.

Pratheek S. Upadhyaya, Aly Sabri Abdalla,Vuk Marojevic,Jeffrey H. Reed,Vijay K. Shah, “Prototyping Next Generation O-RAN Research Testbeds with SDRs”, May 26, 2022, http://arXiv.org.

* cited by examiner

DETECTION METHOD OF RAN INTELLIGENT CONTROLLER IN OPEN ARCHITECTURE

CROSS-REFERENCE TO RELATED PATENT APPLICATION

This application claims the benefit of priority to Taiwan Patent Application No. 112142772, filed on Nov. 7, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a detection device and a detection method, and more particularly to a detection device and a detection method of a RAN (radio access network) intelligent controller in open architecture.

BACKGROUND OF THE DISCLOSURE

Following the proposal of an open network architecture from the O-RAN (open radio access network) Alliance for 5G (fifth-generation cellular network technology) to promote development of the telecommunications network industry, many manufacturers have also started developing RAN intelligent controllers for O-RAN intelligent base stations. However, while various manufacturers have actively engaged in the development of the RAN intelligent controllers, there lacks test methods or test devices with credible and unified specifications, such that the RAN intelligent controllers of different manufacturers cannot be guaranteed to operate normally and comply with the O-RAN standards in practical applications.

SUMMARY OF THE DISCLOSURE

In response to the above-referenced technical inadequacy, the present disclosure provides a detection device and a detection method of a RAN intelligent controller in open architecture.

In order to solve the above-mentioned problem, one of the technical aspects adopted by the present disclosure is to provide a detection device of RAN intelligent controller in open architecture. The detection device includes a standard database, a communication unit, and a judgment unit. The standard database includes a plurality of pieces of standard specified information. Each of the pieces of the standard specified information includes an E2 transmission command and E2 qualification data that match each other. The communication unit is electrically coupled to the standard database, and the communication unit includes a sending module and a receiving module. The sending module is capable of sending the E2 transmission command to a near-real time radio access network intelligent controller, so that the near-real time radio access network intelligent controller is configured to be connected to an evolved node B and a next generation node B through an E2 interface for sending E2 feedback data to the receiving module. The judgment unit is electrically coupled to the standard database and the communication unit. The judgment unit selects a matching one of the E2 qualification data according to the E2 transmission command for comparison with the E2 feedback data. When the E2 feedback data is the same as the E2 qualification data, the judgment unit determines that the near-real time radio access network intelligent controller has a standard state in the E2 interface. When the E2 feedback data is different from the E2 qualification data, the judgment unit determines that the near-real time radio access network intelligent controller has an error state in the E2 interface.

In order to solve the above-mentioned problem, another one of the technical aspects adopted by the present disclosure is to provide a detection method of RAN intelligent controller in open architecture, which is applicable to a computing device. The detection method includes: generating a plurality of pieces of standard specified information, wherein each of the pieces of the standard specified information includes an E2 transmission command and E2 qualification data that match each other; sending the E2 transmission command to a near-real time radio access network intelligent controller, so that the near-real time radio access network intelligent controller is configured to be connected to an evolved node B and a next generation node B through an E2 interface for sending E2 feedback data; selecting a matching one of the E2 qualification data according to the E2 transmission command for comparison with the E2 feedback data; determining, in response to the E2 feedback data being the same as the E2 qualification data, that the near-real time radio access network intelligent controller has in a standard state in the E2 interface; and determining, in response to the E2 feedback data being different from the E2 qualification data, that the near-real time radio access network intelligent controller has in an error state in the E2 interface.

Therefore, in the detection device and the detection method of the RAN intelligent controller in open architecture provided by the present disclosure, by virtue of "the sending module being capable of sending the E2 transmission command to a near-real time radio access network intelligent controller, so that the near-real time radio access network intelligent controller is configured to be connected to an evolved node B and a next generation node B through an E2 interface for sending E2 feedback data to the receiving module," and "the judgment unit selecting a matching one of the E2 qualification data according to the E2 transmission command for comparison with the E2 feedback data," the detection device and the detection method can check whether or not the specifications of the near-real time radio access network intelligent controller in the E2 interface comply with the standards (e.g., the standards established by the O-RAN Alliance).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
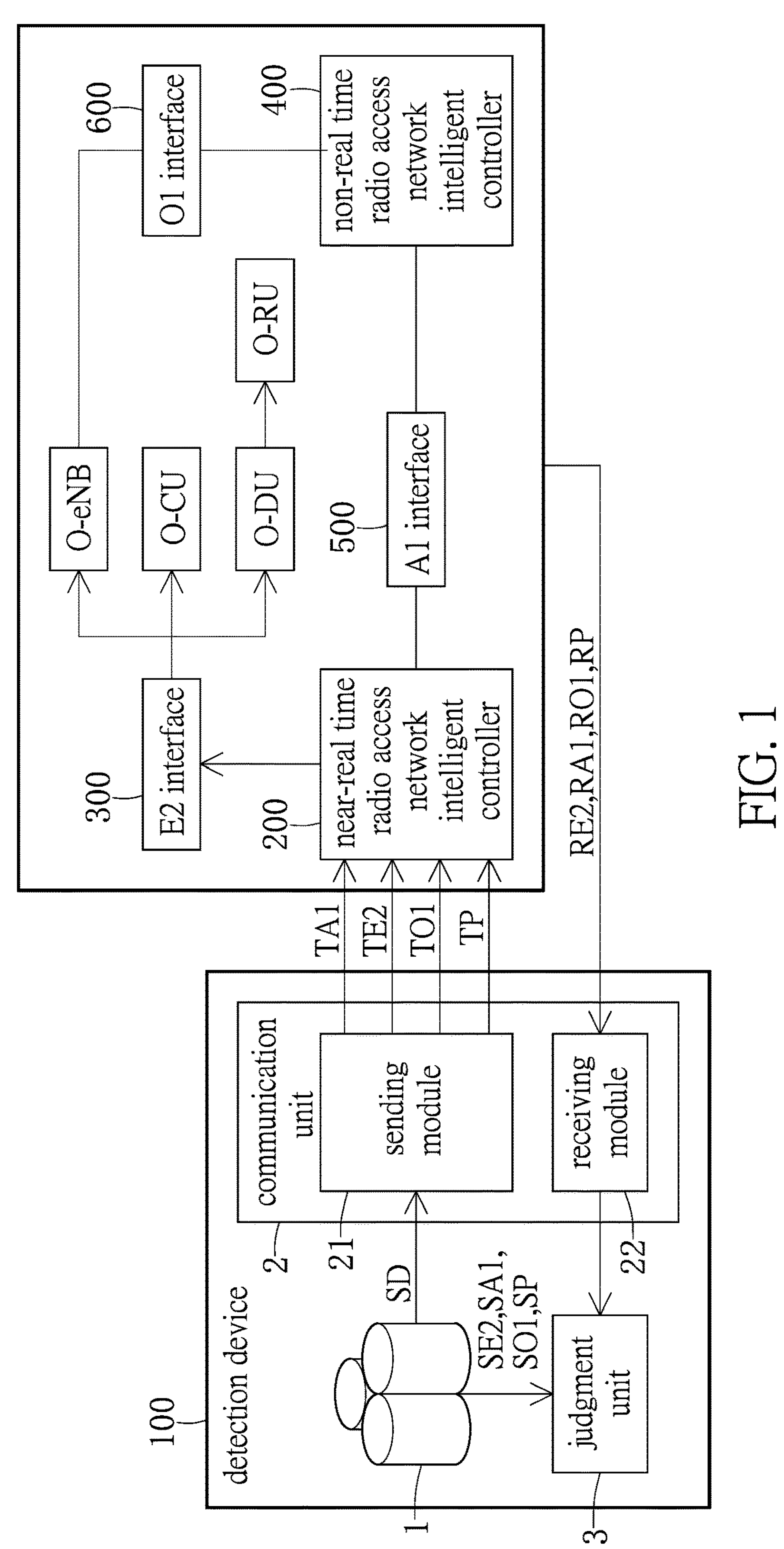
FIG. 1 is a schematic view of a detection device of a RAN intelligent controller in open architecture according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In the following description, if it is indicated that "reference is made to a specific figure" or "as shown in a specific figure", this is only to emphasize that in the description that follows, most content related thereto is depicted in said specific figure. However, the description that follows should not be construed as being limited to said specific figure only.

Referring to FIG. 1 to FIG. 5, the present disclosure provides a detection device 100 of a RAN intelligent controller in open architecture. The detection device 100 detects the RAN intelligent controller that adopts the open network architecture of an O-RAN (i.e., open radio access network), so as to ensure that the RAN intelligent controller from different manufacturers can uniformly comply with the regulations of the O-RAN Alliance. In other words, any detection devices used to detect closed network equipment (e.g., a closed network device in 3GPP standardized architecture) is not the detection device 100 of the present disclosure.

Figure 2:
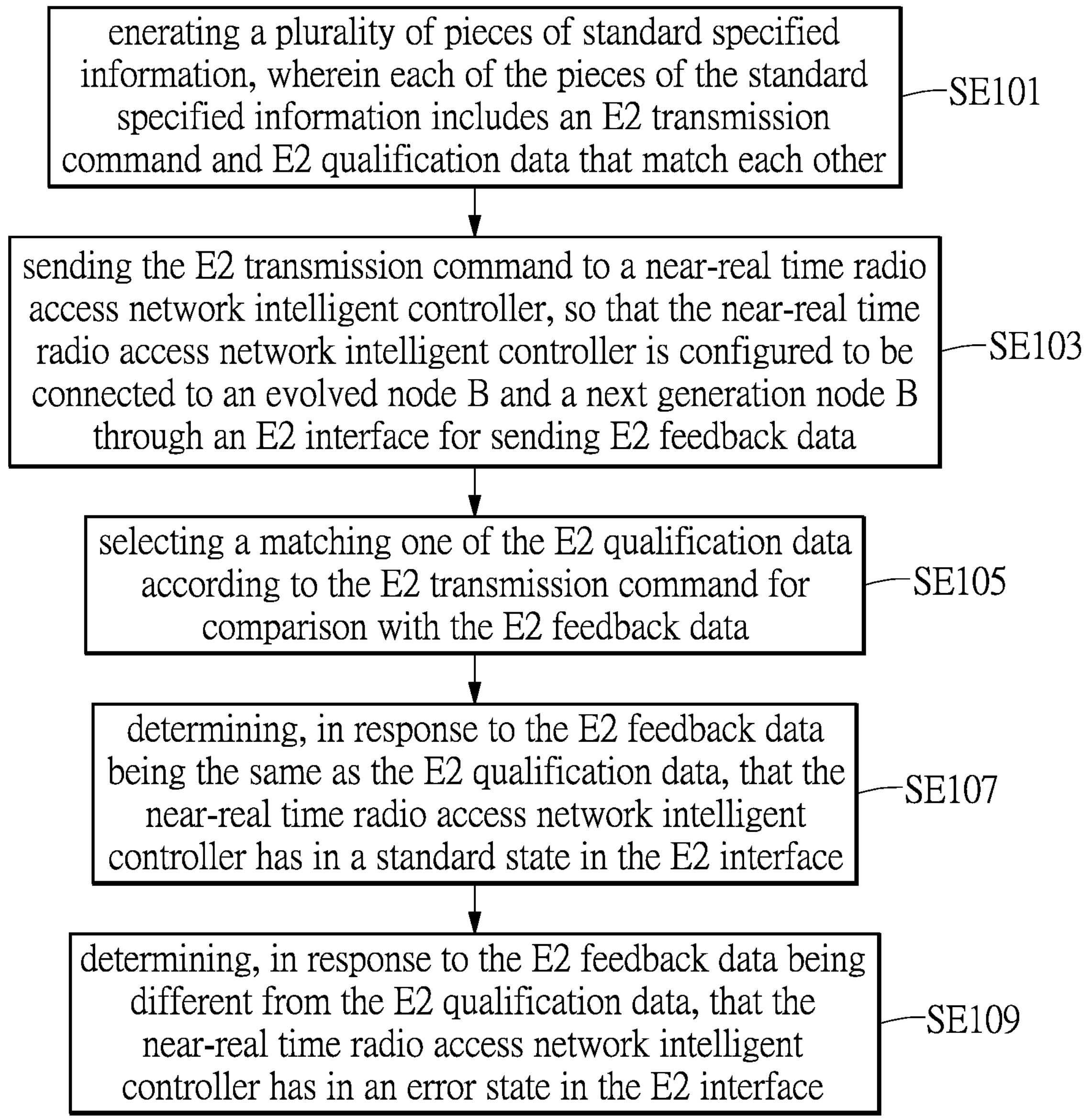
FIG. 2 is a flowchart of a detection method of the RAN intelligent controller in open architecture in an E2 interface according to the present disclosure.

Referring to FIG. 1 and FIG. 2, the detection device 100 includes a standard database 1, a communication unit 2 electrically coupled to the standard database 1, and a judgment unit 3 that is electrically coupled to the standard database 1 and the communication unit 2. The following description describes the structure and connection relation of each component of the detection device 100.

The standard database 1 includes a plurality of pieces of standard specified information SD, and these pieces of the standard specified information SD refer to the specifications established by the O-RAN Alliance. Each of the pieces of the standard specified information SD in an E2 interface 300 of the O-RAN architecture includes an E2 transmission command TE2 and E2 qualification data SE2 that match each other. The E2 transmission command TE2 is sent to a near-real time radio access network intelligent controller 200, so that the near-real time radio access network intelligent controller 200 can return E2 feedback data RE2 under the E2 interface 300. The E2 qualification data SE2 is the standard data that should be responded to in the E2 interface 300.

Referring to FIG. 1 and FIG. 2, the communication unit 2 is used to connect the near-real time radio access network intelligent controller 200, so as to send commands to and receives data from the near-real time radio access network intelligent controller 200. Specifically, the communication unit 2 includes a sending module 21 and a receiving module 22. The sending module 21 can send the E2 transmission command TE2 to the near-real time radio access network intelligent controller 200 in a wired or wireless manner, so that the near-real time radio access network intelligent controller 200 is configured to be connected to an evolved node B (i.e., eNB) and a next generation node B (i.e., gNB) through the E2 interface 300 for sending the E2 feedback data RE2 to the receiving module 22.

It should be noted that a base station in a long term evolution (i.e., LTE) system is referred to as the evolved node B (i.e., eNB). Conventional 5G architecture is divided into three layers: a central unit (i.e., CU), a distributed unit (i.e., DU), and a radio unit (i.e., RU). The O-RAN Alliance standardizes these three layers as O-CU, O-DU, and O-RU. Therefore, the next generation node B proposed by the O-RAN Alliance includes O-DU, O-CU, and O-RU.

The O-CU is responsible for a packet data convergence protocol (i.e., PDCP) layer for packet data aggregation. The O-DU handles all baseband processing, scheduling, radio link control (i.e., RLC), medium access control (i.e., MAC), and a physical layer (i.e., PHY). The O-RU is responsible for components processed by the physical layer, which include analog components of wireless transmitters and receivers. In addition, the O-CU involves centralized and virtualized tasks, and typically runs on x86-based computers/servers. The O-DU is typically a virtualized component, and its virtualization often requires hardware acceleration in the form of field programmable gate array (i.e., FPGA) or graphics processing unit (i.e., GPU).

Referring to FIG. 1 and FIG. 2, the judgment unit 3 can detect whether or not the near-real time radio access network intelligent controller 200 complies with the standards established by the O-RAN Alliance. Specifically, the judgment unit 3 selects a matching one of the E2 qualification data SE2 according to the E2 transmission command TE2 that is sent by the sending module 21 for comparison with the E2 feedback data RE2. When the E2 feedback data RE2 is the same as the E2 qualification data SE2, the judgment unit 3 determines that the near-real time radio access network intelligent controller 200 has a standard state in the E2 interface 300. When the E2 feedback data RE2 is different from the E2 qualification data SE2, the judgment unit 3 determines that the near-real time radio access network intelligent controller 200 has an error state in the E2 interface 300.

Preferably, the detection device 100 of the present disclosure can further detect whether or not the near-real-time radio access network intelligent controller 200 has the error state in an A1 interface, an O1 interface, and an extended application program. That is to say, the detection device 100 is capable of verifying whether or not the near-real-time radio access network intelligent controller 200 complies with the specifications of the O-RAN Alliance.

Figure 3:
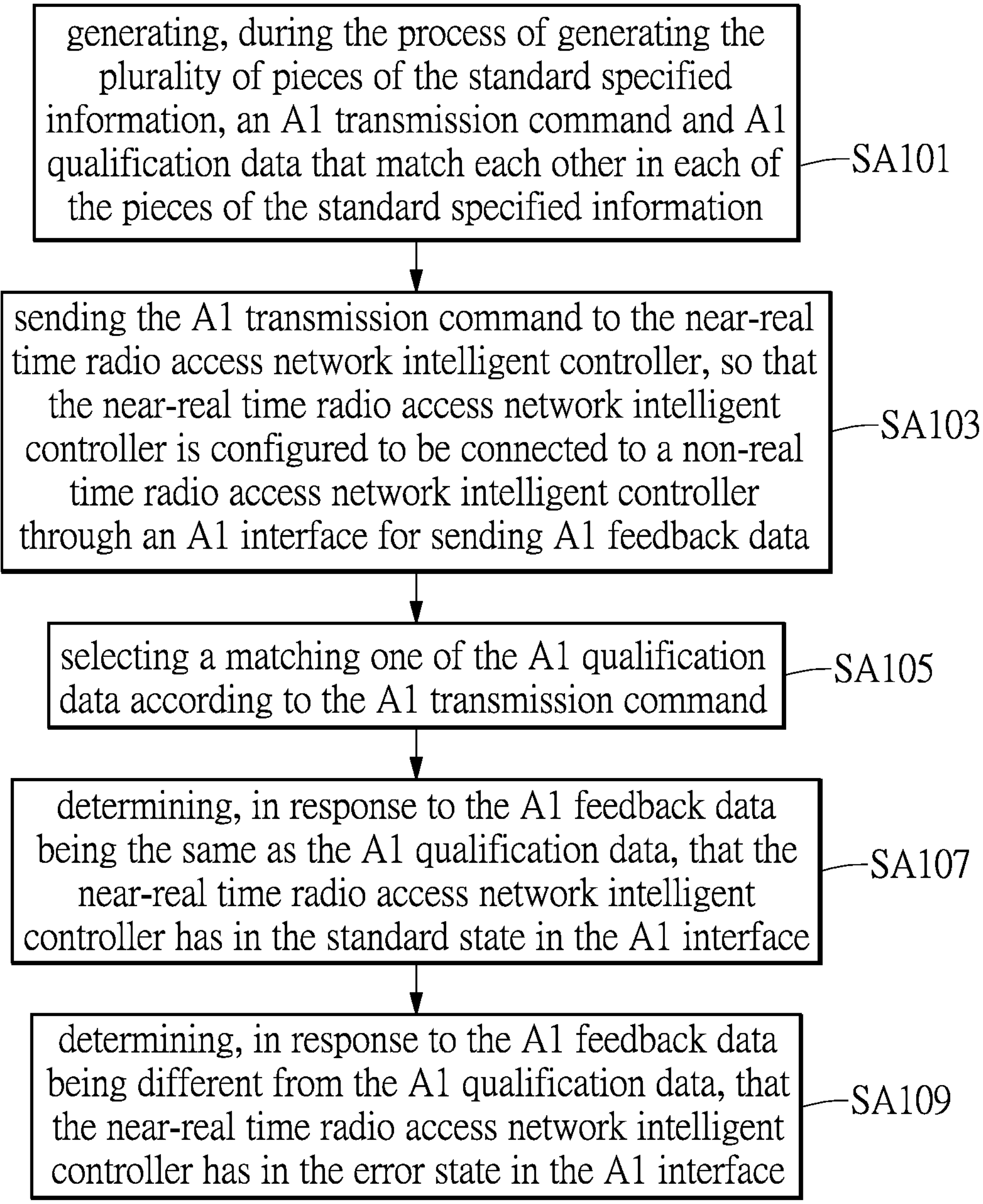
FIG. 3 is a flowchart of the detection method of the RAN intelligent controller in open architecture in an A1 interface according to the present disclosure.

Specifically, as shown in FIG. 1 and FIG. 3, each of the pieces of the standard specified information SD in an A1 interface 500 under the O-RAN architecture also includes an A1 sending command TA1 and A1 qualification data SA1 that match each other. The sending module 21 is capable of sending the A1 transmission command TA1 to the near-real time radio access network intelligent controller 200, so that the near-real time radio access network intelligent controller 200 is configured to be connected to a non-real time radio access network intelligent controller 400 through the A1 interface 500 for sending A1 feedback data RA1 to the receiving module 22. The judgment unit 3 selects a matching one of the A1 qualification data SA1 according to the A1 transmission command TA1 for comparison with the A1 feedback data RA1. When the A1 feedback data RA1 is the same as the A1 qualification data SA1, the judgment unit 3 determines that the near-real time radio access network intelligent controller 200 has the standard state in the A1 interface 500. When the A1 feedback data RA1 is different from the A1 qualification data SA1, the judgment unit 3 determines that the near-real time radio access network intelligent controller 200 has the error state in the A1 interface 500.

Figure 4:
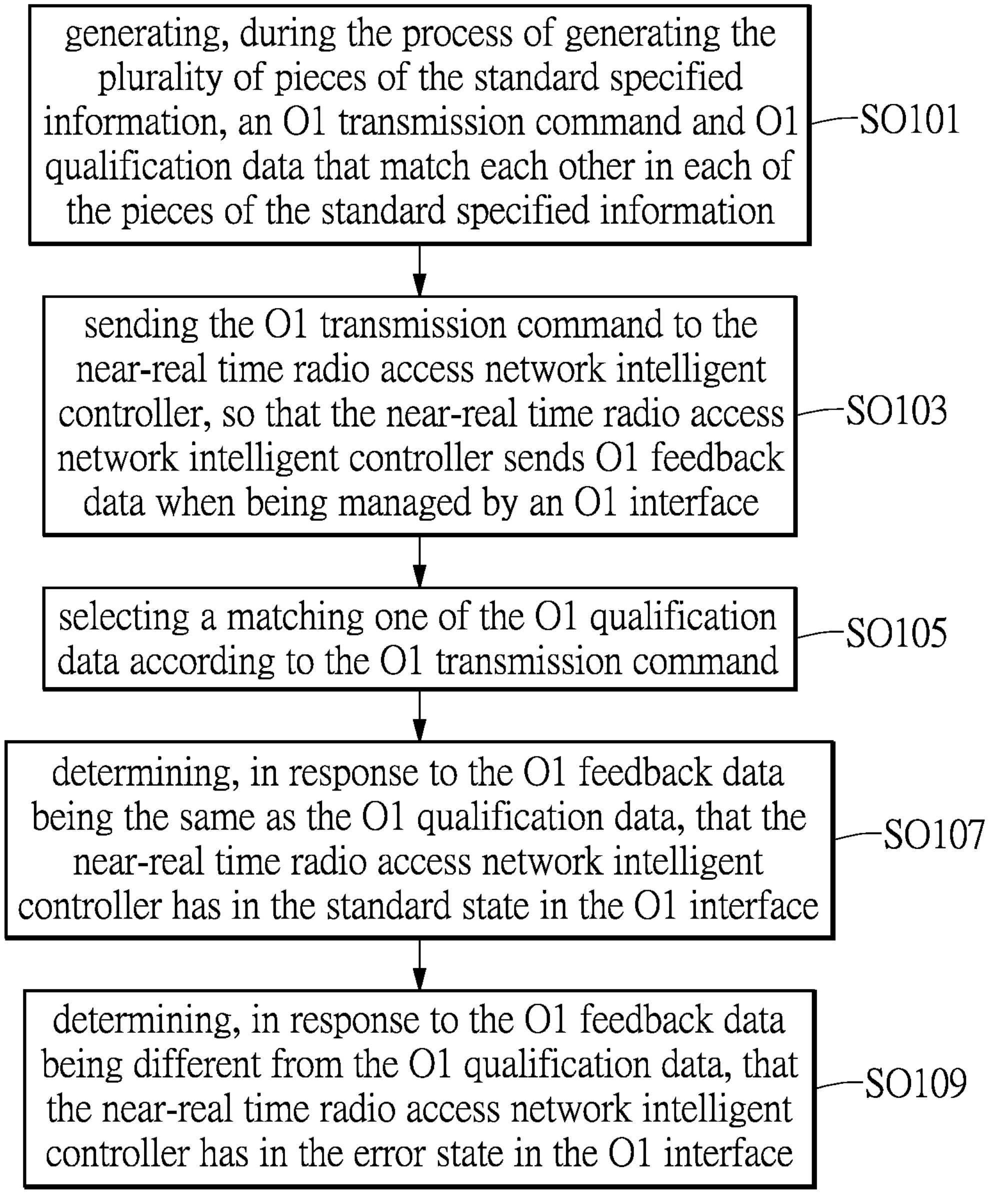
FIG. 4 is a flowchart of the detection method of the RAN intelligent controller in open architecture in an O1 interface according to the present disclosure.

Referring to FIG. 1 and FIG. 4, each of the pieces of the standard specified information SD in an O1 interface 600 under the O-RAN architecture also includes an O1 transmission command TO1 and O1 qualification data SO1 that match each other. The sending module 21 is capable of sending the O1 transmission command TO1 to the near-real time radio access network intelligent controller 200, so that the near-real time radio access network intelligent controller 200 sends to the receiving module 22 O1 feedback data RO1 when managed by the O1 interface 600. The judgment unit 3 selects a matching one of the O1 qualification data SO1 according to the O1 transmission command TO1 for comparison with the O1 feedback data RO1. When the O1 feedback data RO1 is the same as the O1 qualification data SO1, the judgment unit 3 determines that the near-real time radio access network intelligent controller 200 has the standard state in the O1 interface 600. When the O1 feedback data RO1 is different from the O1 qualification data SO1, the judgment unit 3 determines that the near-real time radio access network intelligent controller 200 has the error state in the O1 interface 600.

Figure 5:
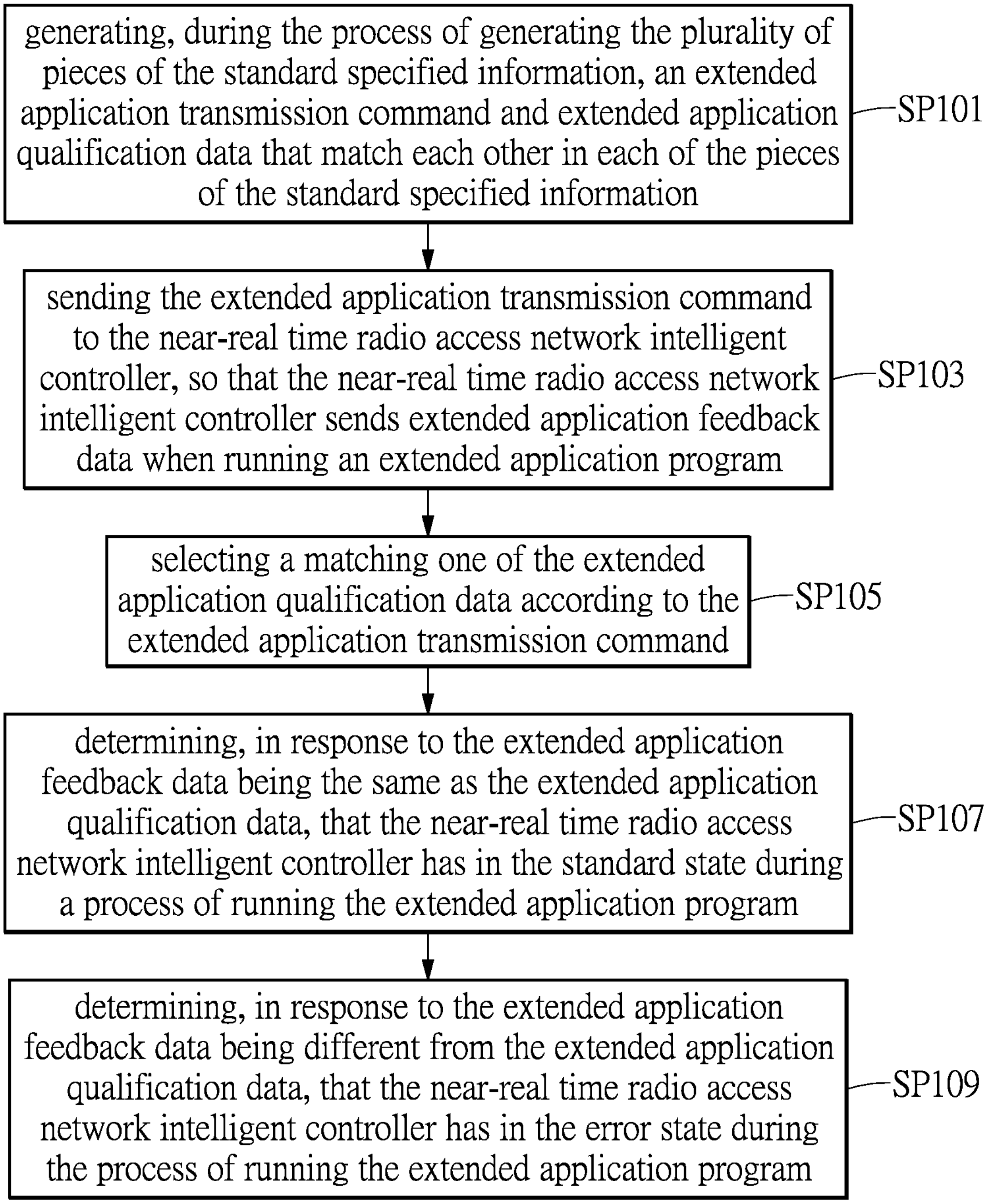
FIG. 5 is a flowchart of the detection method of the RAN intelligent controller in open architecture in an extended application program according to the present disclosure.

Moreover, referring to FIG. 1 and FIG. 5, each of the pieces of the standard specified information SD in the extended application program under the O-RAN architecture also includes an extended application transmission command TP and extended application e SP that match each other. The sending module 21 is capable of sending the extended application transmission command TP to the near-real time radio access network intelligent controller 200, so that the near-real time radio access network intelligent controller 200 sends extended application feedback data RP to the receiving module 22 when running the extended application program. The judgment unit 3 selects a matching one of the extended application qualification data SP according to the extended application transmission command TP for comparison with the extended application feedback data RP. When the extended application feedback data RP is the same as the extended application qualification data SP, the judgment unit 3 determines that the near-real time radio access network intelligent controller 200 has the standard state during the process of running the extended application program. When the extended application feedback data RP is different from the extended application qualification data SP, the judgment unit 3 determines that the near-real time radio access network intelligent controller 200 has the error state during the process of running the extended application program.

Naturally, in addition to detecting whether or not the near-real-time radio access network intelligent controller 200 has the error state in the E2 interface 300, the detection device 100 of the present disclosure allows designers to choose and test at least one of the A1 interface 500, the O1 interface 600, and the extended application program based on practical requirements.

It is worth mentioning that, when the detection device 100 has the function of detecting the E2 interface 300, the A1 interface 500, the O1 interface 600, and the extended application program, the detection device 100 can further identify whether a currently detected interface is the E2 interface 300, the A1 interface 500, the O1 interface 600, or the extended application program through a command (or signal) sent by the sending module 21 to the near-real time radio access network intelligent controller 200. That is to say, the detection device 100 of the present disclosure can perform hybrid testing (through algorithms).

In addition, for the detection device 100, the present disclosure further provides a detection method of a RAN intelligent controller in open architecture, which is applicable to a computing device. In other words, the detection method can also be applied to the above-mentioned detection device 100 for detecting the RAN intelligent controller using the open network architecture of the O-RAN (i.e., open radio access network). The detection method includes steps SE101 to SE109 (as shown in FIG. 2).

Step SE101 is implemented by generating a plurality of pieces of standard specified information SD. Each of the pieces of the standard specified information SD includes an E2 transmission command TE2 and E2 qualification data SE2 that match each other.

Step SE103 is implemented by sending the E2 transmission command TE2 to a near-real time radio access network intelligent controller 200, so that the near-real time radio access network intelligent controller 200 is configured to be connected to an evolved node B and a next generation node B through an E2 interface 300 for sending E2 feedback data RE2.

Step SE105 is implemented by selecting a matching one of the E2 qualification data SE2 according to the E2 transmission command TE2 for comparison with the E2 feedback data RE2.

Step SE107 is implemented by determining, in response to the E2 feedback data RE2 being the same as the E2 qualification data SE2, that the near-real time radio access network intelligent controller 200 has in a standard state in the E2 interface 300.

Step SE109 is implemented by determining, in response to the E2 feedback data RE2 being different from the E2 qualification data SE2, that the near-real time radio access network intelligent controller 200 has in a standard state in the E2 interface 300.

Naturally, the detection method of the present disclosure can further verify whether or not the near-real-time radio access network intelligent controller 200 has the error state in an A1 interface 500, an O1 interface 600, and an extended application program.

In one example, when the detection method is enhanced to include the function of testing the A1 interface 500, the detection method can further include steps SA101 to SA109 (as illustrated in FIG. 3).

Specifically, during the process of generating the plurality of pieces of the standard specified information SD (i.e., step SE101), step SA101 is implemented by generating an A1 sending command TA1 and A1 qualification data SA1 that match each other in each of the pieces of the standard specified information SD.

Step SA103 is implemented by sending the A1 command TA1 to the near-real time radio access network intelligent controller 200, so that the near-real time radio access network intelligent controller 200 is configured to be connected to a non-real time radio access network intelligent controller 400 through the A1 interface 500 for sending A1 feedback data RA1.

Step SA105 is implemented by selecting a matching one of the A1 qualification data SA1 according to the A1 transmission command TA1.

Step SA107 is implemented by determining, in response to the A1 feedback data RA1 being the same as the A1 qualification data SA1, that the near-real time radio access network intelligent controller 200 has in the standard state in the A1 interface 500.

Step SA109 is implemented by determining, in response to the A1 feedback data RA1 being different from the A1 qualification data SA1, that the near-real time radio access network intelligent controller 200 has in the error state in the A1 interface 500.

Steps SA101 to SA109 may follow steps SE101 to SE109, or may be interspersed between steps SE101 and SE109. That is to say, the sequence of the steps in the present disclosure can be adjusted according to practical requirements.

In another example, when the detection method is enhanced to include the function of testing the O1 interface 600, the detection method can further include steps SO101 to SO109 (as illustrated in FIG. 4).

Specifically, during the process of generating the plurality of pieces of the standard specified information SD (i.e., step SE101), step SO101 is implemented by generating an O1 sending command TO1 and O1 qualification data SO1 that match each other in each of the pieces of the standard specified information SD.

Step SO103 is implemented by sending the O1 command TO1 to the near-real time radio access network intelligent controller 200, so that the near-real time radio access network intelligent controller 200 sends O1 feedback data RO1 when managed by the O1 interface 600.

Step SO105 is implemented by selecting a matching one of the O1 qualification data SO1 according to the O1 transmission command TO1.

Step SO107 is implemented by determining, in response to the O1 feedback data RO1 being the same as the O1 qualification data SO1, that the near-real time radio access network intelligent controller 200 has in the standard state in the O1 interface 600.

Step SO109 is implemented by determining, in response to the O1 feedback data RO1 being different from the O1 qualification data SO1, that the near-real time radio access network intelligent controller 200 has in the error state in the O1 interface 600.

Steps SO101 to SO109 may follow steps SE101 to SE109, or may be interspersed between steps SE101 and SE109. That is to say, the sequence of the steps in the present disclosure can be adjusted according to practical requirements.

In yet another example, when the detection method is enhanced to include the function of testing the extended application program, the detection method can further include steps SP101 to SP109 (as illustrated in FIG. 5).

Specifically, during the process of generating the plurality of pieces of the standard specified information SD (i.e., step SE101), step SP101 is implemented by generating an extended application transmission command TP and extended application qualification data SP that match each other in each of the pieces of the standard specified information SD.

Step SP103 is implemented by sending the extended application transmission command TP to the near-real time radio access network intelligent controller 200, so that the near-real time radio access network intelligent controller 200 sends extended application feedback data RP when running the extended application program.

Step SP105 is implemented by selecting a matching one of the extended application qualification data SP according to the extended application transmission command TP.

Step SP107 is implemented by determining, in response to the extended application feedback data RP being the same as the extended application qualification data SP, that the near-real time radio access network intelligent controller 200 has in the standard state during a process of running the extended application program.

Step SP109 is implemented by determining, in response to the extended application feedback data RP being different from the extended application qualification data SP, that the near-real time radio access network intelligent controller 200 has in the error state during the process of running the extended application program.

Steps SP101 to SP109 may follow steps SE101 to SE109, or may be interspersed between steps SE101 and SE109. That is to say, the sequence of the steps in the present disclosure can be adjusted according to practical requirements.

Beneficial Effects of the Embodiment

In conclusion, in the detection device and the detection method of the RAN intelligent controller in open architecture provided by the present disclosure, by virtue of "the sending module being capable of sending the E2 transmission command to a near-real time radio access network intelligent controller, so that the near-real time radio access network intelligent controller is configured to be connected to an evolved node B and a next generation node B through an E2 interface for sending E2 feedback data to the receiving module," and "the judgment unit selecting a matching one of the E2 qualification data according to the E2 transmission command for comparison with the E2 feedback data," the detection device and the detection method can check whether or not the specifications of the near-real time radio access network intelligent controller in the E2 interface comply with the standards (e.g., the standards established by the O-RAN Alliance).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A detection method of a RAN intelligent controller in open architecture, which is applicable to a computing device, the detection method comprising:

generating a plurality of pieces of standard specified information, wherein each of the pieces of the standard specified information includes an E2 transmission command and E2 qualification data that match each other;

sending the E2 transmission command to a near-real time radio access network intelligent controller, so that the near-real time radio access network intelligent controller is configured to be connected to an evolved node B and a next generation node B through an E2 interface for sending E2 feedback data;

selecting a matching one of the E2 qualification data according to the E2 transmission command for comparison with the E2 feedback data;

determining, in response to the E2 feedback data being the same as the E2 qualification data, that the near-real time radio access network intelligent controller has in a standard state in the E2 interface; and determining, in response to the E2 feedback data being different from the E2 qualification data, that the near-real time radio access network intelligent controller has in an error state in the E2 interface.

2. The detection method according to claim 1, further comprising:

generating, during the process of generating the plurality of pieces of the standard specified information, an A1 transmission command and A1 qualification data that match each other in each of the pieces of the standard specified information;

sending the A1 transmission command to the near-real time radio access network intelligent controller, so that the near-real time radio access network intelligent controller is configured to be connected to a non-real time radio access network intelligent controller through an A1 interface for sending A1 feedback data;

selecting a matching one of the A1 qualification data according to the A1 transmission command;

determining, in response to the A1 feedback data being the same as the A1 qualification data, that the near-real time radio access network intelligent controller has in the standard state in the A1 interface; and determining, in response to the A1 feedback data being different from the A1 qualification data, that the near-real time radio access network intelligent controller has in the error state in the A1 interface.

3. The detection method according to claim 1, further comprising:

generating, during the process of generating the plurality of pieces of the standard specified information, an O1 transmission command and O1 qualification data that match each other in each of the pieces of the standard specified information;

sending the O1 transmission command to the near-real time radio access network intelligent controller, so that the near-real time radio access network intelligent controller sends O1 feedback data when being managed by an O1 interface;

selecting a matching one of the O1 qualification data according to the O1 transmission command;

determining, in response to the O1 feedback data being the same as the O1 qualification data, that the near-real time radio access network intelligent controller has in the standard state in the O1 interface; and determining, in response to the O1 feedback data being different from the O1 qualification data, that the near-real time radio access network intelligent controller has in the error state in the O1 interface.

4. The detection method according to claim 1, further comprising:

generating, during the process of generating the plurality of pieces of the standard specified information, an extended application transmission command and extended application qualification data that match each other in each of the pieces of the standard specified information;

sending the extended application transmission command to the near-real time radio access network intelligent controller, so that the near-real time radio access network intelligent controller sends extended application feedback data when running an extended application program;

selecting a matching one of the extended application qualification data according to the extended application transmission command;

determining, in response to the extended application feedback data being the same as the extended application qualification data, that the near-real time radio access network intelligent controller has in the standard state during a process of running the extended application program; and determining, in response to the extended application feedback data being different from the extended application qualification data, that the near-real time radio access network intelligent controller has in the error state during the process of running the extended application program.

* * * * *